No. 651,791. Patented June 12, 1900.
W. BRIDGE & P. E. TRAINER.
APPARATUS FOR TEACHING DRAWING.
(Application filed Dec. 19, 1898.)

(No Model.) 3 Sheets—Sheet 1.

WITNESSES:
R. A. Russ
A. M. Wilson

INVENTORS
William Bridge,
Peter E. Trainer,
By R. S. C. Caldwell
Attorney

THE NORRIS PETERS CO., PHOTO-LITHO., WASHINGTON, D. C.

No. 651,791. Patented June 12, 1900.
W. BRIDGE & P. E. TRAINER.
APPARATUS FOR TEACHING DRAWING.
(Application filed Dec. 19, 1898.)
(No Model.) 3 Sheets—Sheet 2.
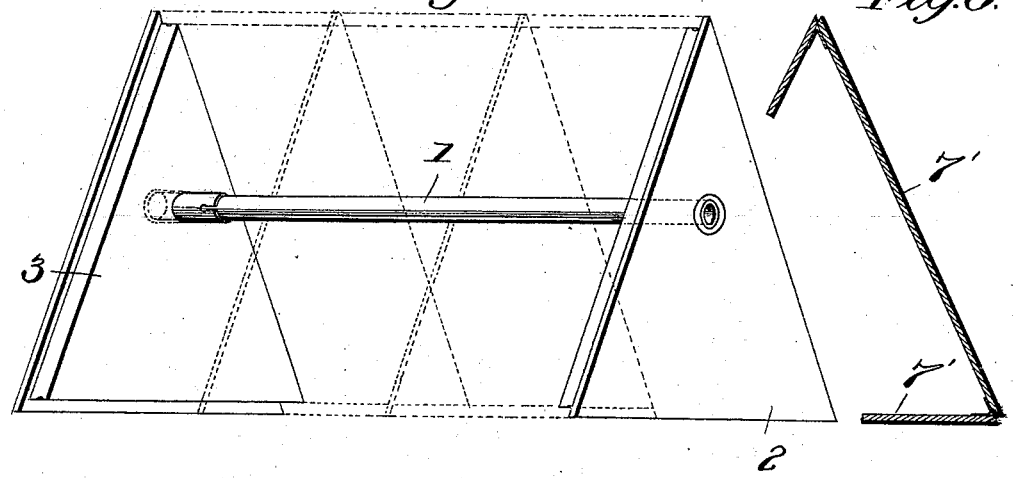
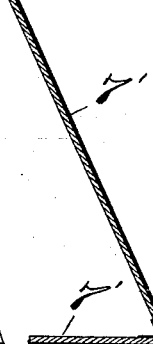
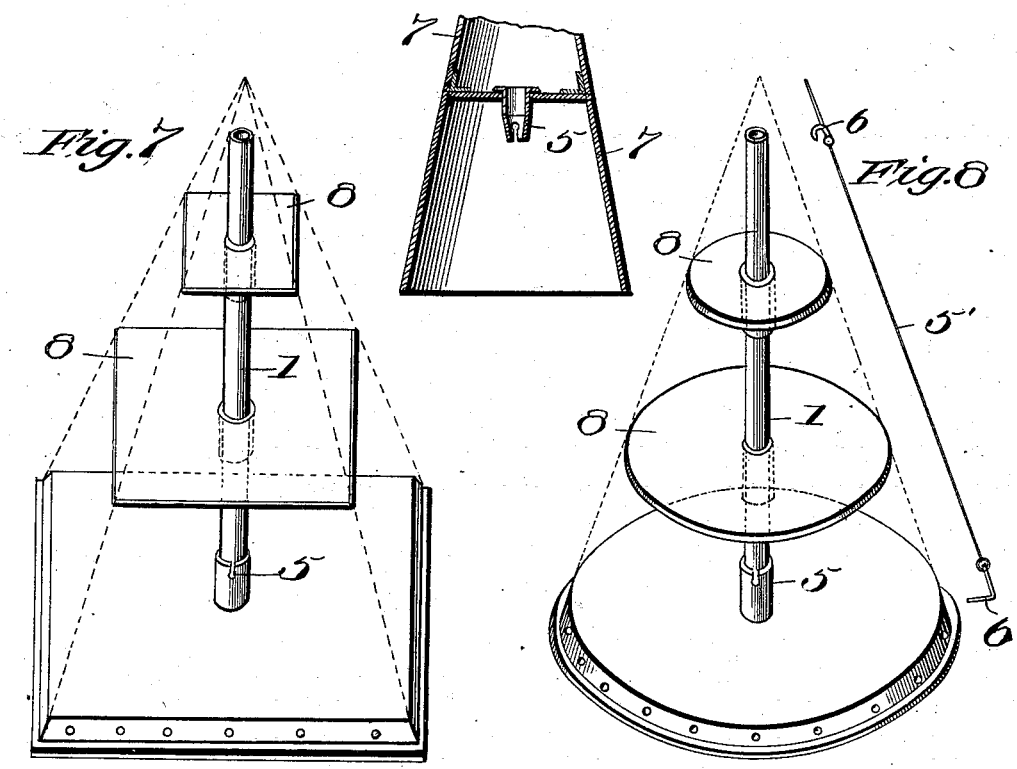
INVENTORS
William Bridge.
Peter E. Trainer.
BY
R. S. C. Caldwell.
ATTORNEY
WITNESSES:

No. 651,791. Patented June 12, 1900.
W. BRIDGE & P. E. TRAINER.
APPARATUS FOR TEACHING DRAWING.
(Application filed Dec. 19, 1898.)
(No Model.) 3 Sheets—Sheet 3.

WITNESSES:
INVENTORS
William Bridge
Peter E. Trainer
BY
R. S. C. Caldwell
ATTORNEY

UNITED STATES PATENT OFFICE.

WILLIAM BRIDGE, OF HEATON MERSEY, AND PETER E. TRAINER, OF GORTON, ENGLAND; SAID BRIDGE ASSIGNOR TO SAID TRAINER.

APPARATUS FOR TEACHING DRAWING.

SPECIFICATION forming part of Letters Patent No. 651,791, dated June 12, 1900.

Application filed December 19, 1898. Serial No. 699,715. (No model.)

*To all whom it may concern:*

Be it known that we, WILLIAM BRIDGE, residing at Heaton Mersey, near Manchester, and PETER EDWARD TRAINER, residing at Brook Road, Gorton, near Manchester, in the county of Lancaster, England, subjects of the Queen of Great Britain and Ireland, have invented certain new and useful Improvements in Models or Apparatus for Teaching Drawing, of which the following is a specification.

This invention relates to the construction of models of such primary forms as the cube, prism, cylinder, cone, and pyramid in such a manner that each of them can be built up, placed together or taken apart, combined with one another, or have added to each complete model or portion of a model certain parts by which they may be made to represent complete models, portions of models, sections, and the like of common objects.

The invention consists, essentially, in constructing primary forms referred to of several parts joined or otherwise combined together which can be built up upon a central rod, tube, or the like, representing the axis of the primary form, so as to demonstrate the appearance of the primary forms themselves either in skeleton or solid.

With these and other objects in view our invention further consists in the novel details of construction and combination of parts to be fully described in the following specification and clearly set forth in the claims.

Figure 2:
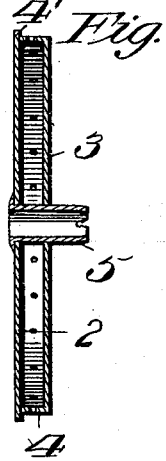
Figure 1:
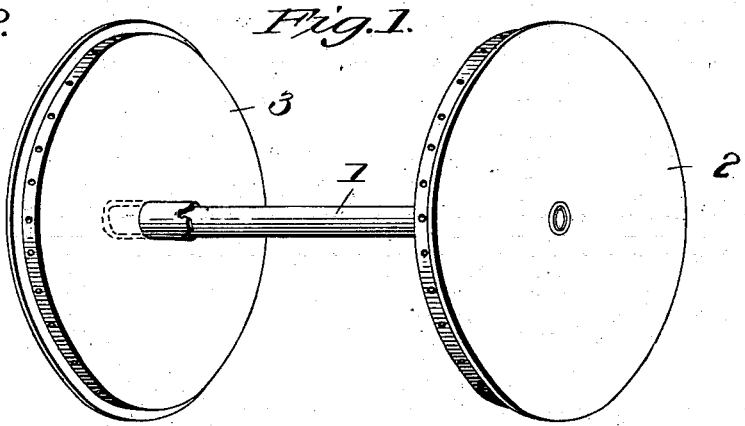
Figure 3:
Figure 4:
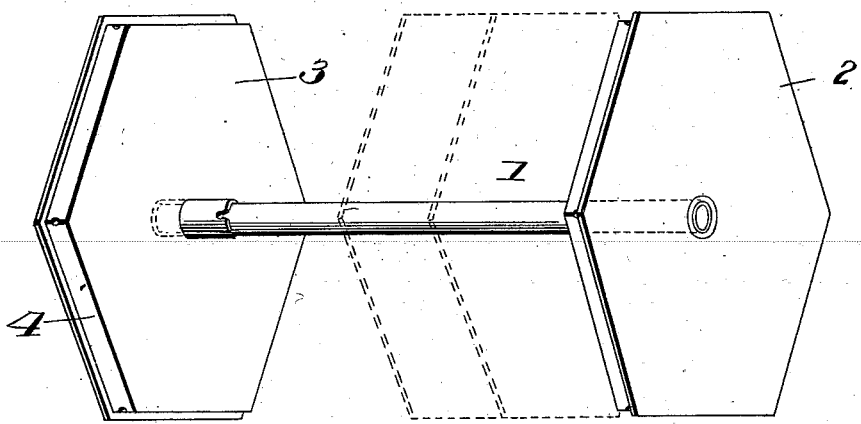
Figure 10:
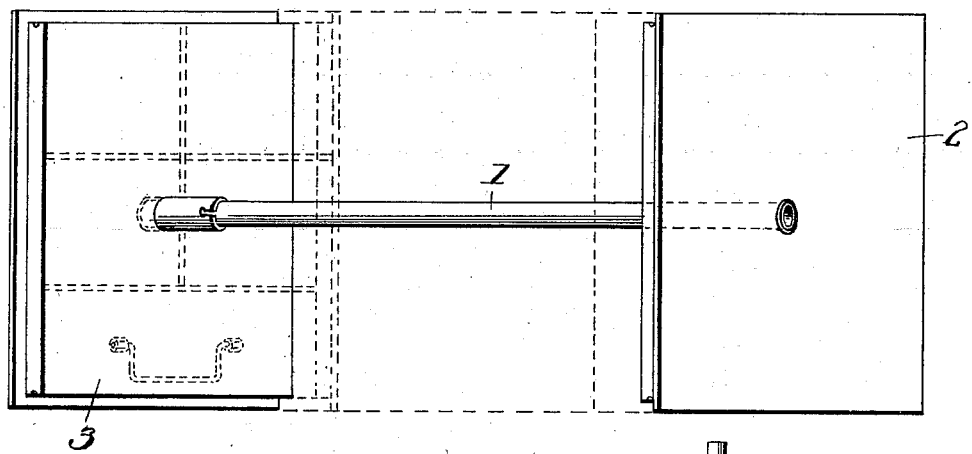
Figure 11:
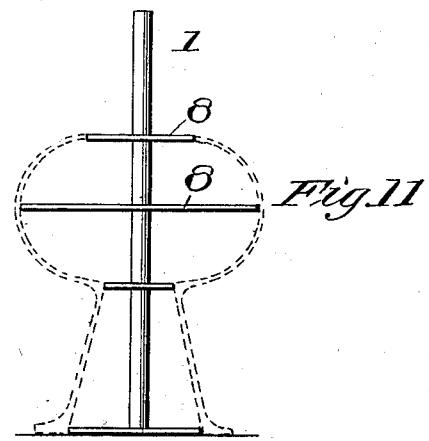
Figure 12:
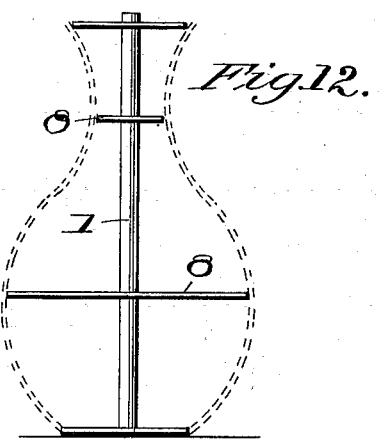

Referring to the accompanying drawings, forming a part of this application, in which like characters of reference indicate similar parts throughout, Figure 1 is a perspective view of a cylinder-frame constructed in accordance with our invention. Fig. 2 is a central vertical sectional view of one of the end disks or planes thereof. Fig. 3 is a detail view of a single side line or rod. Fig. 4 is a perspective view of a hexagonal prism-frame. Fig. 5 is a perspective view of a triangular prism-frame. Fig. 6 is a sectional view of hinged side planes. Fig. 7 is a perspective view of a pyramid-frame. Fig. 8 is a perspective view of a cone-frame, showing a side line removed therefrom. Fig. 9 is a central vertical sectional view of a portion of a cone casing or shell. Fig. 10 is a perspective view of a square prism-frame. Fig. 11 shows a frame for producing an inverted vase by rotation, and Fig. 12 shows a frame for producing an upright vase by rotation.

In carrying out our invention in the construction of the models to indicate the primary forms—such as the cube, prism, cylinder, and pyramid—and which may be of any suitable size we use a rod or tube 1, which represents the axis of the object and upon which the parts forming the model are or may be built. The ends of the cylinders and prisms and the base of the cone and pyramid are made of two planes 2 and 3, joined together by a perforated band 4, so as to lie parallel and concentric with each other, the outer plane 2 being somewhat larger than the inner plane to form a projecting flange 4', entirely surrounding the end piece, which will be herein referred to as an "end plane." A tubular sleeve 5 is riveted to the center of one side of the end plane and extends through and projects from the other side thereof and is tapered and slotted on such projecting end, so that it may firmly grasp the axis 1 when slid thereon to be capable of free adjustment without accidental displacement.

To demonstrate the longitudinal outlines of the body in skeleton form, the bands 4 are adapted to be connected by thin strips 3' of wire, strings, tapes, or the like provided with hooks on their ends engaging the perforations in said bands. In Fig. 8 hooks 6, connected to string or elastic, are used, the bottom hook taking into the perforations in the base of the pyramid and the top hook in the upper end of the axis-tube 1. The upper hook 6 is extended to complete the outline of the cone or pyramid. Instead of the strings being connected to hooks they may be threaded through the perforations in the bands 4 in any suitable way. By the arrangement of wires or strings the axis 1 is visible to the student and its relation to primary form is demonstrated.

When it is desired to show primary forms as solids, an outer envelop or jacket 7 is fitted to the ends or bases of the figures; and consists of a sheet of suitable material fitted to the end planes by bearing on the bands 4 and extending flush with the flanges 4'. This jacket may consist of a single sheet; but it is preferable to make it in two or more parts which when assembled together will make a complete jacket, and when one or more parts are taken away these parts or those which are left will represent some common object, either of themselves or in combination with the axis ends or basis or with the addition found necessary to complete the visual demonstration of the common object. As shown in Fig. 6, the jacket may be also formed of a number of planes 7', hinged together so as to envelop the angular prisms, and, as shown in Fig. 9, for the covering of the cone we may employ a rigid shell formed in a number of sections mounted on the frame and supported at their meeting lines by a number of intermediate disks or planes 8, provided with engaging sleeves 5 similar to the end planes.

In continuation of the lines of our invention we produce visual objects by mounting planes on the central axis, as before, with one or more connecting-strips of any desired shape, which when rapidly rotated about the axis produces to the eye the outline of a symmetrical figure. Thus in Figs. 11 and 12 it is demonstrated that any suitably-shaped vase may be formed by regulating the size and relation of the intermediate disks 8, to which a suitable outline may be attached and rotated about the axis.

What we claim as our invention is—

1. In a device of the character described, a central rod forming the axis of the device, planes slidably mounted thereon, and thin yieldable strips connecting the perimeters of the planes to form outlines, substantially as described.

2. In a device of the character described, a central rod forming the axis of the device, planes slidably mounted thereon, and wires connecting the perimeters of the planes to form outlines, substantially as described.

3. In a device of the character described, a central rod forming the axis of the device, end planes mounted thereon, intermediate planes slidably mounted on the rod, and thin strips connecting the perimeters of the planes, substantially as described.

4. In a device of the character described, a central rod forming the axis of the device, planes slidably mounted thereon and thin strips connecting the perimeters of the planes to form outlines, substantially as described.

5. In a device of the character described, a central rod forming the axis of the device, a plane mounted thereon and provided with a perforated shoulder, thin strips engaging said perforations at one end and means for engaging the other ends of said strips, substantially as described.

6. In a device of the character described, a hollow central rod forming the axis of the device, a plane mounted thereon and provided with a perforated shoulder and thin strips connecting the said perforations with the end of the hollow rod, substantially as described.

7. In a device of the character described, a central rod forming the axis of the device, end planes mounted thereon and provided with shoulders, and means for connecting the shoulders of the said end planes, substantially as described.

8. In a device of the character described, a central rod forming the axis of the device, end planes mounted thereon and provided with shoulders, means for connecting the shoulders of the said end planes and intermediate planes mounted on the central rod, substantially as described.

9. In a device of the character described, a central rod forming the axis of the device, end planes mounted thereon and provided with perforated shoulders, an intermediate plane slidably mounted on the rod and thin strips engaging the perforations of the two end planes, substantially as described.

In witness whereof we have hereunto set our hands in presence of two witnesses.

WILLIAM BRIDGE.
PETER E. TRAINER.

Witnesses:
WILLIAM W. TAYLOR,
JAS. STEWART BROADFOOT.